United States Patent [19]

Fabre et al.

[11] 4,013,149

[45] Mar. 22, 1977

[54] EXTENDER FOR INCREASING THE TRAVEL OF MOTORCYCLE SHOCK ABSORBERS

[76] Inventors: Brian K. Fabre, 9447 Haines Canyon Road, Tujunga, Calif. 91352; John S. Vander Laan, III, 11509 S. Bexley Drive, Whittier, Calif. 90606

[22] Filed: Sept. 22, 1975

[21] Appl. No.: 615,287

Related U.S. Application Data

[63] Continuation-in-part of Ser. No. 527,068, Nov. 25, 1974, Pat. No. 3,912,054.

[52] U.S. Cl. .................................. 188/281; 188/317; 188/322
[51] Int. Cl.² .......................................... F16F 9/54
[58] Field of Search ............ 280/276; 188/281, 282, 188/279, 314, 315, 284, 317, 289, 321, 286, 287, 322

[56] References Cited

UNITED STATES PATENTS

| | | | |
|---|---|---|---|
| 2,332,520 | 10/1943 | Lucht | 188/289 X |
| 2,453,966 | 11/1948 | Brown et al. | 188/289 |
| 3,679,029 | 7/1972 | Thomas | 188/321 |
| 3,810,659 | 5/1974 | Marcil | 188/322 X |
| 3,891,199 | 6/1975 | Willich et al. | 188/289 X |

*Primary Examiner*—Trygve M. Blix
*Assistant Examiner*—Douglas C. Butler

[57] ABSTRACT

A device for extending the travel of motorcycle shock absorbers without the necessity of replacing the damper rod within the shock absorber. The device is a member having a cylindrical body portion with a frustro-conical portion which terminates in a threaded extension member extending outwardly axially with respect to the body. An axially aligned threaded opening is positioned in the base of the member and has the same thread size as the threaded extension of the member. Alternatively, the device can consist of a two part member having a central threaded bolt surrounded by a cylindrical length having a frustro-conical terminus. An oil flow stop member may be included for insertion into the central passageway of the damper rod of the shock absorber for use with certain shock absorbers where necessary to maintain an appropriate metering ratio when the original cone is replaced with the device of the present invention.

6 Claims, 6 Drawing Figures

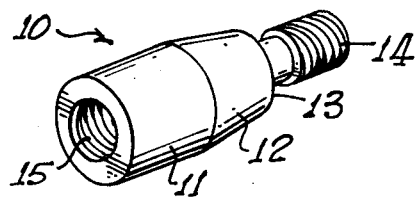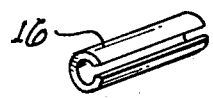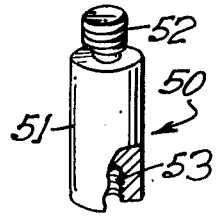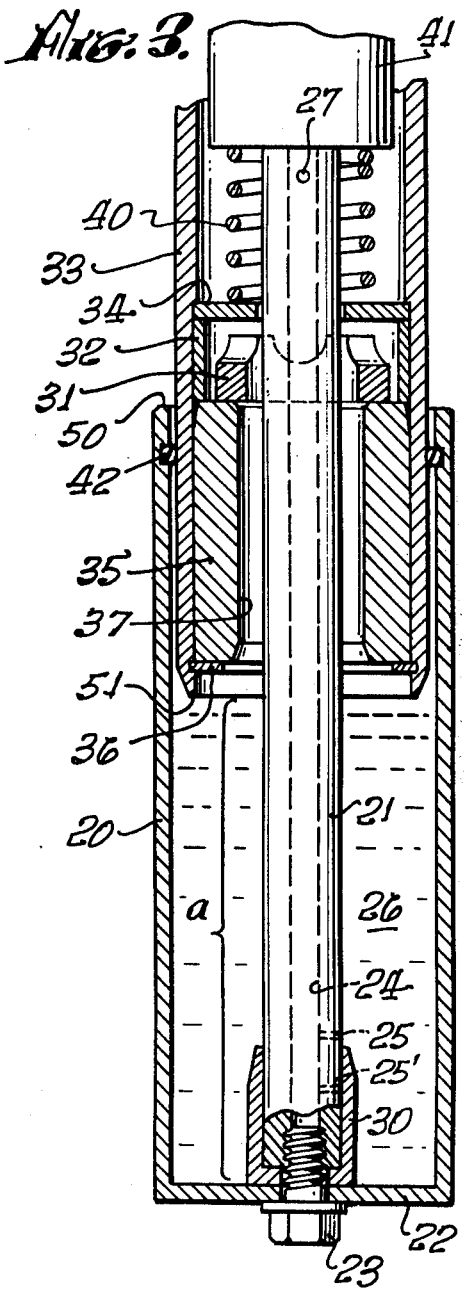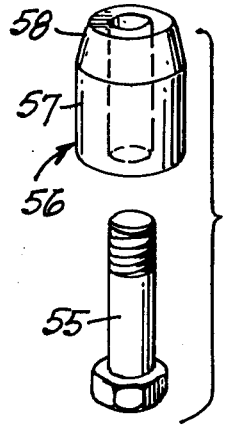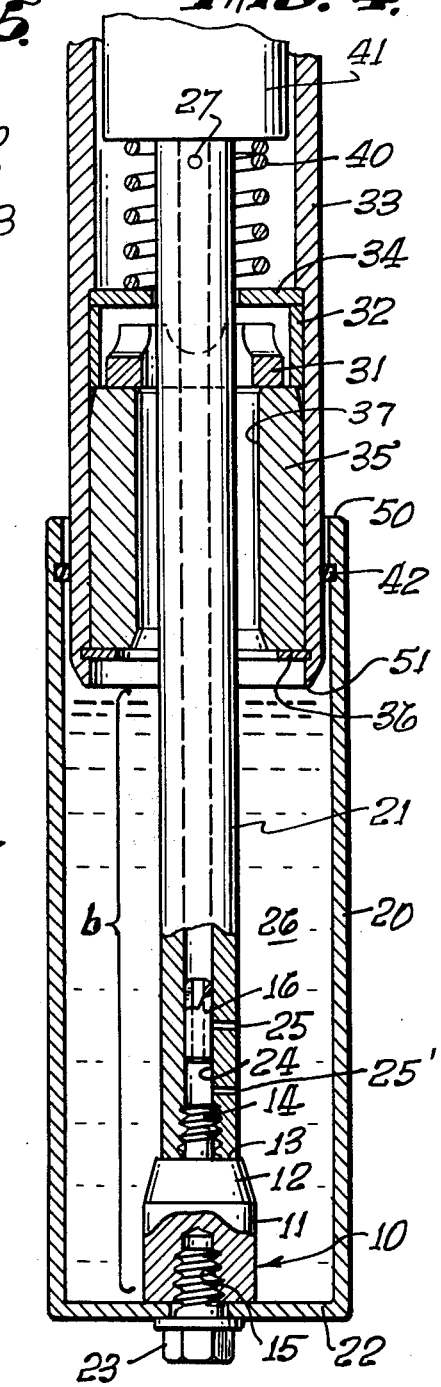

EXTENDER FOR INCREASING THE TRAVEL OF MOTORCYCLE SHOCK ABSORBERS

CROSS REFERENCE TO RELATED APPLICATION

This application is a continuation in part of applicant's pending application Ser. No. 527,068 filed Nov. 25, 1974 now U.S. Pat. No. 3,912,054 and entitled "VALVE REPLACEMENT ASSEMBLY FOR MOTORCYCLE FRONT FORKS".

BACKGROUND OF THE INVENTION

Most motorcycles have a pair of shock absorbers which dampen the vertical movement of the front wheel of the motorcycle. These shock absorbers are commonly referred to as "forks" and, like most shock absorbers, offer less resistance to compression than they do to extension. Applicant's parent application described an assembly which could be used as a kit to replace the valve assembly in an existing shock absorber and change its damping characteristics. This change generally had the effect of softening the ride by decreasing the resistance to compression.

For extreme applications such as motocross, off the road or racing uses, the shock absorbers can bottom out— that is, reach a fully compressed configuration wherein no further compression is possible. This, of course, terminates any further shock absorbing characteristics and can result in a jolt which can be both uncomfortable and could cause damage to the motorcycle. For this reason, it is often desirable to increase the travel of the front forks to increase the reaction time of the fork. In the past this could only be done by purchasing a new shock absorber which permitted further travel or by replacing some major component of the shock absorber. The expense of such a change is substantial and thus for many users the problem had no economical solution.

SUMMARY OF THE INVENTION

It is thus an object of the present invention to provide a device which will increase the length of travel of motorcycle shock absorbers without the necessity of replacing the shock absorber or any major component thereof.

The present invention is for a device for extending the travel of motorcycle shock absorbers without the necessity of replacing any major component of the shock absorber. The device is a member having a cylindrical body portion with a frustro-conical area along one end. At the smaller end of the frustro-conical area a threaded extension member is axially positioned with respect to the body. At the end opposite the threaded extension of the member there is an axial threaded opening having the same size as the threaded extension on the other end of the member. Alternatively, the device can be made from two or more parts such as a threaded bolt surrounded by a cylindrical length having a frustro-conical end. Oil flow stop means may be provided for insertion in the central passageway of the damper rod of the shock absorber for use with certain shock absorbers where necessary to maintain an appropriate metering ratio when the original cone is replaced with the device of the present invention. The use of a roll pin to provide the stop flow means forms a part of the present invention.

BRIEF DESCRIPTION OF THE DRAWINGS

FIG. 1 is a perspective view of the fork extender of the present invention.

FIG. 2 is a perspective view of a roll pin useful for stopping the oil flow in an orifice in the damper rod.

FIG. 3 is a cross-sectional side elevation of the lower end of the motorcycle shock absorber in its unmodified configuration.

FIG. 4 is a cross-sectional side elevation of the lower end of the shock absorber of FIG. 3 modified by the fork extender of the present invention.

FIG. 5 is a perspective view of an alternate embodiment of the extender of the present invention.

FIG. 6 is a perspective view of an alternate embodiment of the extender of the present invention.

DESCRIPTION OF THE PREFERRED EMBODIMENTS

A fork extender of the type of the present invention is shown in FIG. 1 and indicated generally by reference character 10. The extender has a cylindrical portion 11 which terminates in a frustro-conical portion 12. At the terminus 13 of the frusto-conical portion 12 there is a threaded extension 14 which may be screwed into the threaded opening of a damper rod in a manner described below. At the other end of fork extender 10 is an axially aligned threaded opening 15 which has the same thread size as extension 14.

For some configurations of shock absorbers the installation of the device of the present invention exposes an oil orifice in the damper rod and it becomes necessary to block off this opening located in the central passageway of the damper rod to maintain proper metering ratio. The roll pin 16 shown in FIG. 2 is useful for this purpose. Its insertion will be described in conjunction with a description of FIG. 4 below.

A motorcycle shock absorber is shown schematically in cross-sectional view in FIG. 3. The lower cylindrical portion is generally referred to as a slider and is indicated in the drawings by reference character 20. A damper rod 21 is affixed to the bottom of the slider 22 by a damper rod screw 23 which screws into the central passageway 24. Passageway 24 is, of course, threaded at its lower terminus to accept damper rod screw 23. An opening or orifice 25 permits the passage of oil which fills the interior of the shock absorber and is indicated by reference character 26. The oil travels through opening 25 and into the central passageway and out of opening 27 at the upper end of damper rod 21.

The lower end of damper rod 21 is held securely both by damper rod screw 23 and oil lock piece 30. In some shock absorber designs a second opening 25' is located below the upper end of oil lock piece 30 which may have a plurality of passageways through its base to permit the passage of oil from passageway 24 through orifice 25' and into the oil reservoir inside of slider 20.

The damping effect of the shock absorber results largely from the dampening ratio hole 25 in conjunction with valve 31 which is positioned in sleeve 32 which in turn is held in the fork tube or stanchion 33. The upward movement of valve 31 is stopped by flat washer 34 and its downward movement is stopped by piston 35. Piston 35 is held in stanchion 33 by stop ring 36. When the shock absorber nears maximum compression the oil lock piece 30 passes into the central opening 37 of piston 35. This greatly increases the damping effect and helps to prevent a mechanical contact between piston 35 and the bottom 22 of the slider at full compression stroke.

In both FIGS. 3 and 4, the shock absorber is shown in its maximum extended configuration where rebound spring 40 contacts flat washer 34 and bushing 41. The oil 26 is sealingly held within the shock absorber by fork seal or 0-ring 42. A further description of the action of the valve shown in FIG. 3 is contained in applicant's application Ser. No. 527,068 filed Nov. 25, 1974 which is incorporated by reference herein.

The maximum travel of the shock absorber shown in FIG. 3 is indicated by the letter $a$. As the stanchion 33 extends downwardly into slider 20 the maximum downward movement possible would occur when the lower end of stanchion 33 contacts the bottom 22 of slider 20.

The extended version of the shock absorber shown in FIG. 3 is shown in FIG. 4 where fork extender 10 has replaced oil lock piece 30 and has acutally become an extension of damper rod 21. Extender 10 is first screwed onto the lower end of damper rod 21 and then held in slider 20 by damper rod screw 23. The maximum amount of travel of the extended shock absorber of FIG. 4 is indicated by "b" and it is apparent that a substantial increase in travel has been obtained without the necessity of having to replace any major portion of the existing shock absorber.

In some shock absorbers it is necessary to close opening 25 or 25' to prevent the flow of oil through that passageway in order to maintain the desired metering ratio. For this purpose roll pin 16 is inserted through the lower end of central passageway 24 and forced up so that it closes opening 25.

It is, of course, necessary that the unmodified shock absorber have sufficient overlap between stanchion 33 and slider 20 so that the extension caused by the addition of extender 13 is not so great that stanchion 33 extends beyond slider 20. It has been found that the distance between upper end 50 of slider 20 and lower end 51 of stanchion 33 should be at least 3 inches when used with a fork extender having a height of 1-⅛ inch as measured between its bottom and its terminus 13.

The extender should, of course, be fabricated from a material having sufficient strength to bear the dynamic loads of the damper rod in compression and expansion. The outer configuration of the fork extender 10 should be approximately the same as that of oil lock piece 30 in order to permit the same extreme damping at the point of maximum compression.

Two alternate configurations of the device of the present invention are shown in FIGS. 5 and 6. The device 50 of FIG. 5 is adapted to be used in conjunction with the existing oil lock piece 30 of the shock absorber to be modified. It has a cylindrical body 51 having a threaded extension 52 at one end and a threaded opening 53 at its other end. The opening 53 accepts bolt 23 and threaded extension 52 screws into the lower end of damper rod 21. The oil lock piece 30 surrounds the cylindrical body 51 of device 50. The second alternate is shown in FIG. 6 where a bolt 55 is inserted through the bottom 22 of the slider 20 and oil lock piece 56 is placed over the shaft of bolt 55. Oil lock piece 56 has a hollow cylindrical body 57 and has a frustro-conical portion 58 at one end. These two alternative configurations result in an extended fork analagous to that shown in FIG. 4.

While the invention has been described with respect to the front wheel shock absorbers of motorcycles, the invention is, of course, useful for the rear wheels as well as for similar shock absorbers which are used in other applications.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. In a shock absorber of the type having a cylindrical oil-containing slider having a bottom end, a damper rod affixed to the bottom end of the slider, a fork tube having a lower end within said slider, and vertically movable with respect to the slider, a piston affixed in the lower end of the fork tube, the improvement which comprises:

a fork extender inside said slider and affixed at its lower end to the bottom end of the slider and positioned at the central axis of the slider, said fork extender having an exterior cylindrical body portion along its lower end, an exterior frustro-conical area above the cylindrical body portion decreasing in outside diameter upwardly along the extender, said frustro-conical area having an outside dimension small enough so that is can pass into the lower end of the piston to provide extreme damping near the point of maximum compression, and means for affixing in axial alignment the fork extender to the damper rod.

2. The device of claim 1 wherein said fork extender is a unitary member having a threaded extension at its frustro-conical end and an axially aligned threaded opening at its lower end.

3. The device of claim 1 wherein said means for affixing the fork extender to the damper rod comprises a cylindrical passageway substantially smaller in diameter than the outside diameter of the damping rod, said passageway being axially positioned through said cylindrical body portion and a bolt extending through the bottom end of the slider, said bolt passing therethrough and extending beyond the terminus of the frustro-conical area, said bolt having a threaded end for screwing into the lower end of the damper rod.

4. The device of claim 1 wherein said damper rod further includes oil flow stop means for positioning in a central passageway of said damper rod.

5. The device of claim 4 wherein said oil flow stop means comprises a roll pin having an outside diameter of sufficient size so that it fits tightly into the central passageway of the damper rod.

6. The device of claim 1 wherein said fork extender has an inner member having a cylindrical outer wall having the same outside diameter as the damper rod, said inner member being positioned along the central axis of the fork extender.

* * * * *